United States Patent
Inada et al.

[11] Patent Number: 5,769,451
[45] Date of Patent: Jun. 23, 1998

[54] VEHICLE AIR BAG APPARATUS

[75] Inventors: Haruhiro Inada, Hiroshima; Yasunori Iwamoto, Hatsukaichi; Shigefumi Kohno, Hiroshima; Toshiaki Kuroda, Higashihiroshima, all of Japan

[73] Assignee: Mazda Motor Corporation, Hiroshima, Japan

[21] Appl. No.: 859,254

[22] Filed: May 20, 1997

Related U.S. Application Data

[63] Continuation of Ser. No. 300,937, Sep. 6, 1994, abandoned, which is a continuation of Ser. No. 11,491, Jan. 29, 1993, abandoned.

[30] Foreign Application Priority Data

Jan. 30, 1992 [JP] Japan ..................................... 4-015404

[51] Int. Cl.$^6$ .................................................. B60R 21/16
[52] U.S. Cl. ........................................ 280/732; 280/728.3
[58] Field of Search ............................ 280/728.1, 728.2, 280/728.3, 732

[56] References Cited

U.S. PATENT DOCUMENTS

| | | | |
|---|---|---|---|
| 4,893,833 | 1/1990 | Disalvo et al. ......................... | 280/732 |
| 4,989,896 | 2/1991 | DiSalvo et al. . | |
| 5,031,930 | 7/1991 | Sato ..................................... | 280/728 B |
| 5,152,548 | 10/1992 | Zushi .................................. | 280/728 B |
| 5,199,739 | 4/1993 | Fujiwara et al. ......................... | 280/732 |
| 5,217,250 | 6/1993 | Sakata .................................. | 280/728.3 |
| 5,320,380 | 6/1994 | Hamada ............................... | 280/728 B |

FOREIGN PATENT DOCUMENTS

| | | | |
|---|---|---|---|
| 2-283546 | 11/1990 | Japan . | |
| 3-50053 | 3/1991 | Japan ................................ | 280/728 A |
| 3-276846 | 12/1991 | Japan ................................ | 280/728 B |
| 4-27636 | 1/1992 | Japan ................................ | 280/728 B |
| 2244459 | 12/1991 | United Kingdom ............... | 280/728 B |

*Primary Examiner*—Paul N. Dickson

[57] ABSTRACT

A vehicle air bag apparatus which includes an air bag module having an air bag, an inflator for filling the air bag with gas and an ignitor for driving the inflator. The vehicle air bag apparatus is supported inside of an opening formed in an instrument panel of a vehicle. The vehicle air bag apparatus also includes an air bag lid for closing the opening during non-operating status of the vehicle air bag apparatus, a hinge member for supporting the air bag lid openably and closeably in correspondence to the opening in the instrument panel, and a projection member formed integrally with the rear surface of the air bag lid. The projection member extends toward, and is fixed to, the air bag module. The projection member holds the air bag lid so as to close the opening and reinforces the air bag lid from the rear surface. The projection member includes portions of lower ridigity in which rigidity of a part furthest from the hinge member is the lowest. Upon expansion of the air bag, the portions of lower rigidity break so that the air bag lid no longer acts to close the opening in the instrument panel.

55 Claims, 7 Drawing Sheets

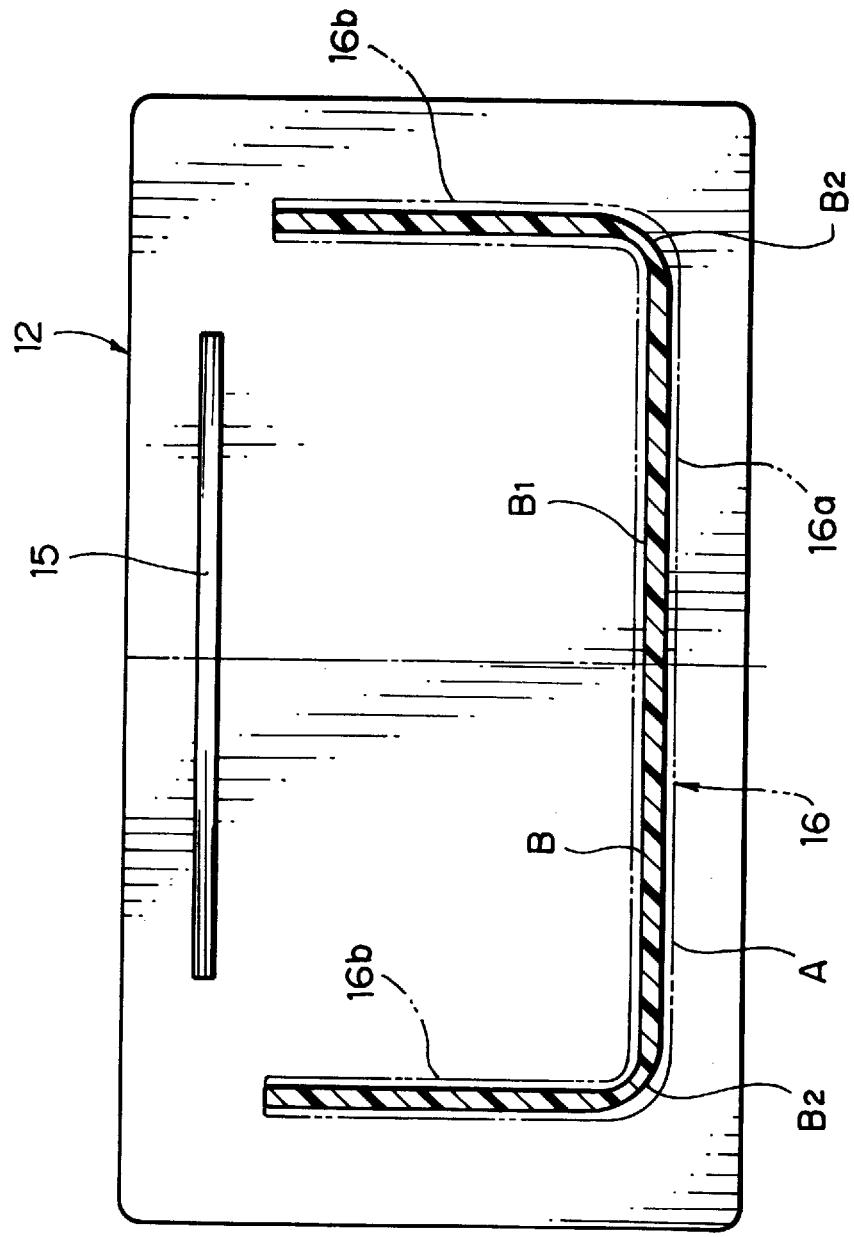

VEHICLE AIR BAG APPARATUS

This application is a continuation of application Ser. No. 08/300,937, filed Sep. 8, 1994, now abandoned, which is a continuation of application Ser. No. 08/011,491, filed Jan. 29, 1993, now abandoned.

BACKGROUND OF THE INVENTION

The present invention relates to an air bag apparatus for vehicles, which is arranged at a portion of an instrument panel in front of a passenger seat.

Conventionally, air bags integrally arranged with a steering wheel have been well known as vehicle air bag apparatuses. These air bags swell at a sudden slowdown of traveling speed to protect a driver. In recent years, air bags on the passenger seat side have been proposed as disclosed in Japanese Patent Application Laid-Open No. 2-283546.

According to the conventional arrangement for a passenger seat air bag as above, an instrument panel has an opening at a portion in front of the passenger seat, and an air bag module (i.e., a unit comprising such as an air bag, an inflator and an ignitor) is arranged inside of the opening. The air bag module has an air bag lid on its front face which covers the opening of the instrument panel. Upon sudden slowdown of the vehicle traveling speed, the air bag in the air bag module swells and expands toward the passenger seat from the opening to protect the passenger.

Today there is a growing demand for low-cost cars, as well as luxury cars, equipped with such passenger air bag apparatuses. For this reason, an air bag lid made with a lower cost material occurs is desirable.

In the above conventional art, the air bag lid is formed integrally with a rib to reinforce rigidity of the inner face of the air bag lid. In this case, however, movement of the air bag lid at the air bag operating time may be disturbed depending upon the shape of the air bag lid.

SUMMARY OF THE INVENTION

The present invention has been designed in consideration of the above, and has as its object to stabilize the movement of the air bag lid and improve the air bag lid rigidity.

According to the present invention, the foregoing object is attained by providing a vehicle air bag apparatus in which an air bag module having an air bag, an inflator for filling the air bag with gas and an ignitor for driving the inflater within its casing is supported by a part of a vehicle body inside of an opening formed in an instrument panel of the vehicle, comprising an air bag lid for closing the opening in non-operating status of the air bag apparatus, a hinge member for supporting the air bag lid openably and closably to the instrument panel, a projection member formed integrally with the rear surface of the air bag lid, for holding the air bag lid so as to close the opening and for reinforcing the air bag lid from the rear surface, the projection member including portions of lower rigidity in which rigidity of a part furthest from the hinge member is the lowest.

In accordance with the present invention as described above, at the air bag apparatus operating time, the projection member breaks from its furthest part from the hinge member so that the air bag lid can be smoothly released with the hinge member as a rotational axis.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a rear view showing an air bag lid of an air bag apparatus according to a second embodiment.

DETAILED DESCRIPTION OF THE PREFERRED EMBODIMENTS

Preferred embodiments of the present invention will be described in detail in accordance with the accompanying drawings.

[First Embodiment]

FIGS. 1 to 6 are diagrams showing a structure of a vehicle air bag apparatus according to a first embodiment.

Figure 1:
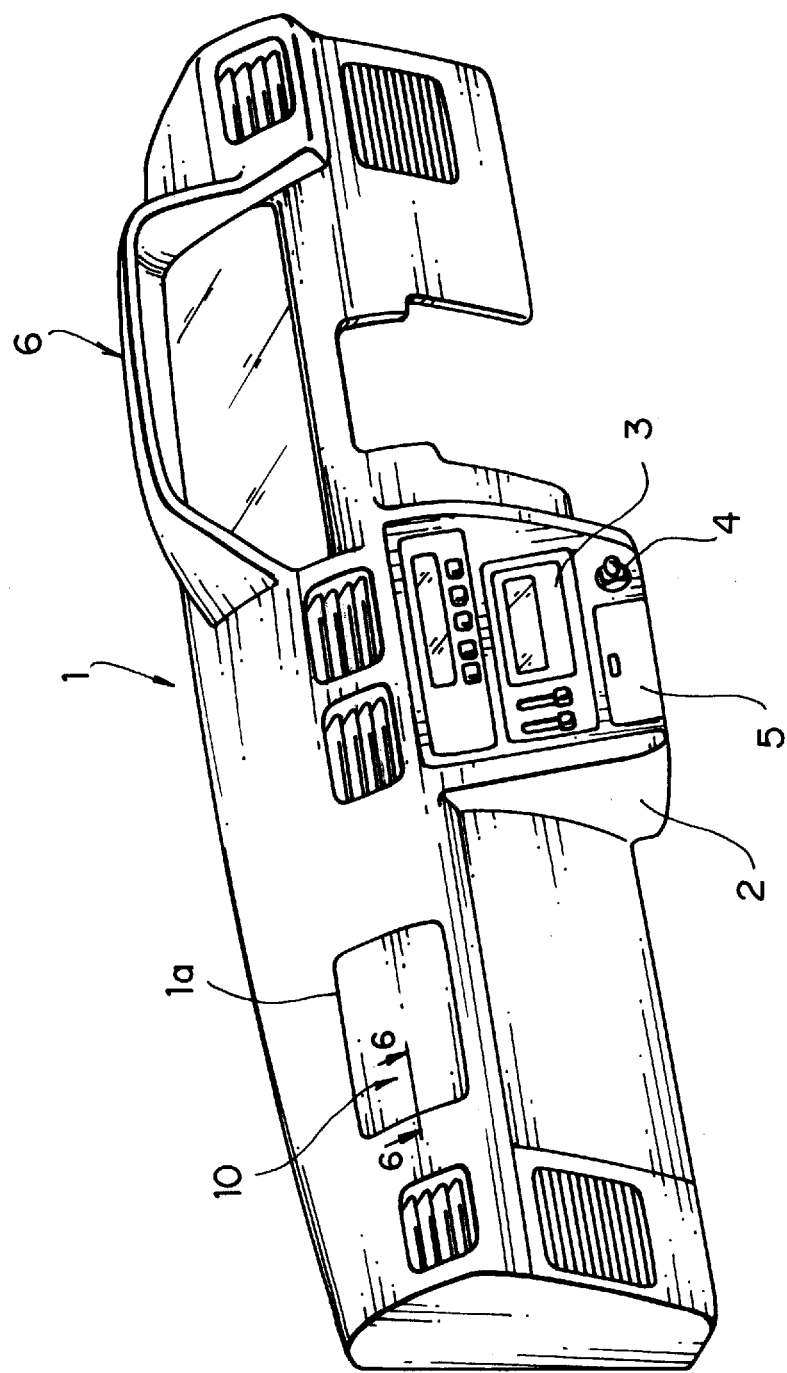
FIG. 1 is a front view showing an instrument panel of a vehicle having an air bag apparatus according to a first embodiment of the present invention.
Figure 2:
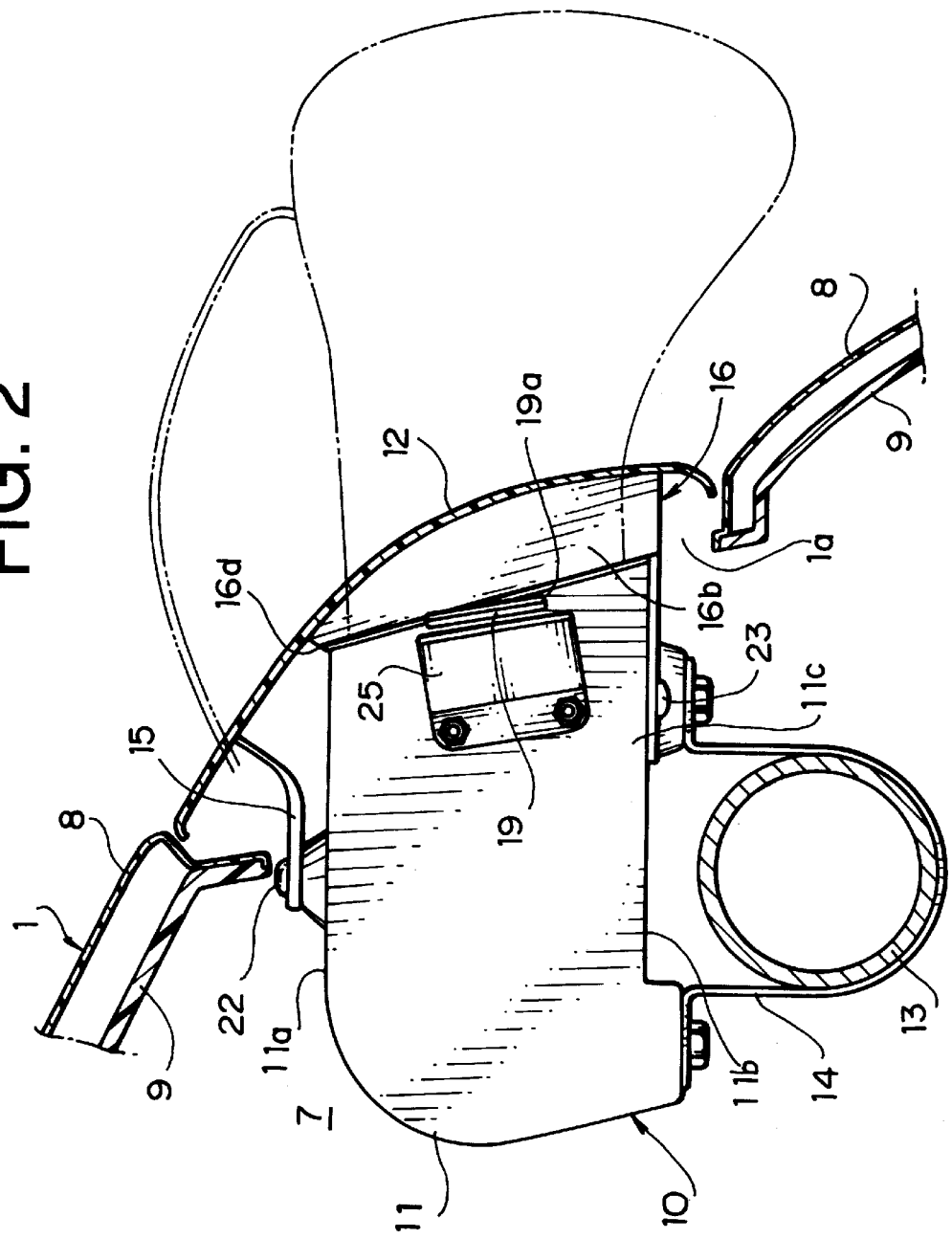
FIG. 2 is a longitudinal sectional view showing a structure of the air bag apparatus.

FIG. 1 illustrates an instrument panel 1 of a car with which an air bag apparatus according to the present invention is equipped. In FIG. 1, audio equipment 3 is arranged at a central portion 2 of the instrument panel 1, and a cigar lighter 4 and an ashtray 5 are arranged under the audio equipment 3. Further, in the instrument panel 1, a cockpit 6 is positioned in front of a driver's seat. As shown in FIG. 2, the instrument panel 1 comprises a surface member 8 which is a thin synthetic resin, a backing member 9 which covers the inner surface of the instrument panel 1 in such manner that air is included between the surface member 8 and the backing member 9. The above arrangement constitutes an air bag apparatus which is light in weight and low in cost.

On the other hand, an opening 1a is formed at a position in the instrument panel 1 in front of the passenger seat, and an air bag apparatus 10 for the passenger seat is arranged inside of the opening 1a.

Figure 3:
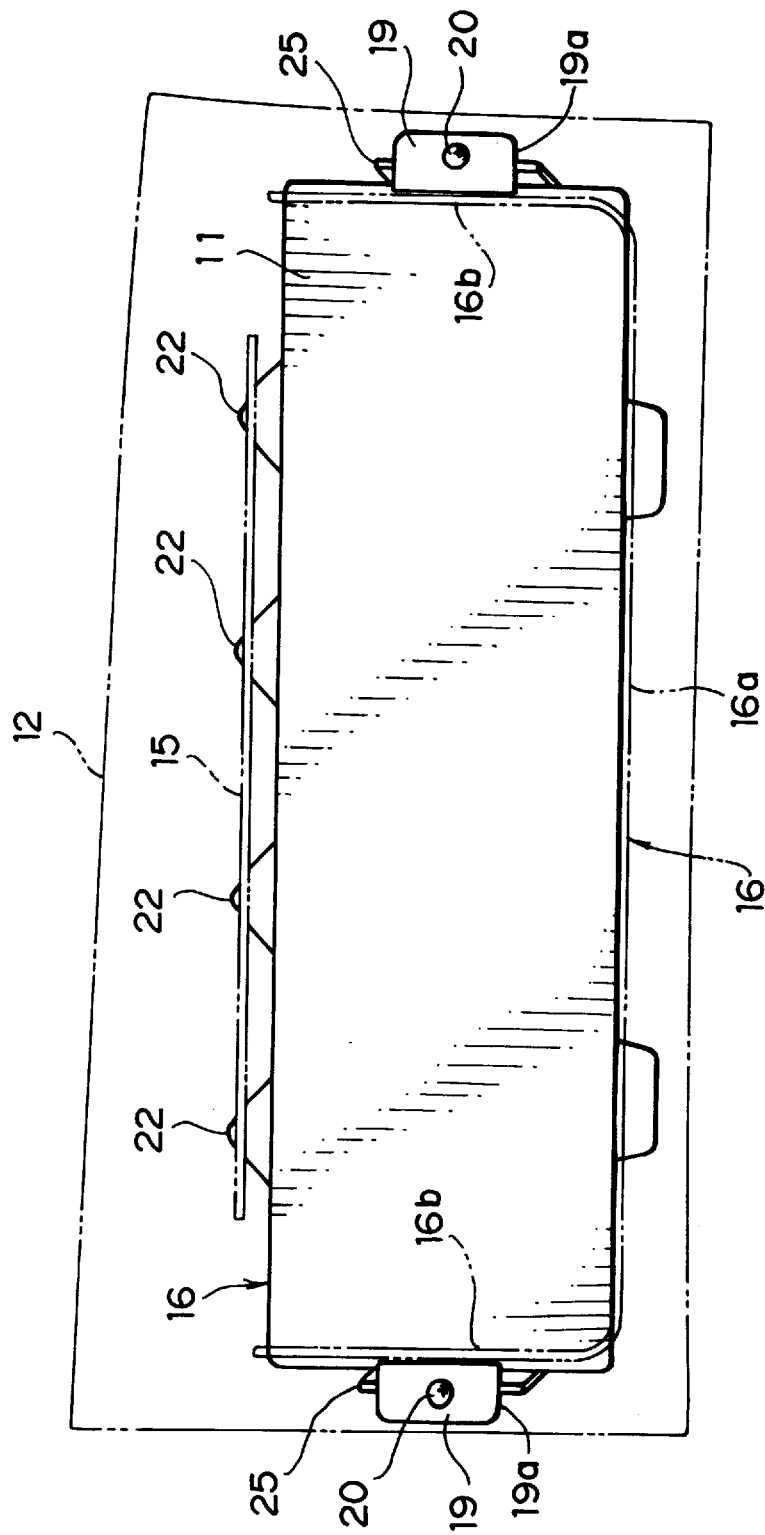
FIG. 3 is a front view showing the structure of the air bag apparatus.

As shown in FIGS. 2 and 3, the air bag apparatus 10 comprises an air bag module 11 which is arranged in a storage space 7 formed inside of the opening 1a of the instrument panel 1 and an air bag lid 12 which is arranged in front of the air bag module 11 and covers the opening 1a. The air bag module 11 includes an air bag (not shown), an inflator (not shown) for inflating the air bag and an ignitor (not shown) for operating the inflator. In this embodiment, the air bag lid 12 comprises a synthetic resin thin plate.

The front surface of the air bag module 11 is opened so that the air bag expands from the opening 1a in front of the passenger seat, as shown by a two dot chain line in FIG. 2, to protect the passenger at a sudden slowdown of vehicle speed.

The air bag module 11 extends in a vehicle width direction in the storage space 7, with both ends of air bag module 11 supported with respect to a steering support member 13 via a bracket 14.

A hinge 15 which projects in a front direction of the vehicle body and whose front end is fixed to an upper surface 11a with a rivet 22 is integrally formed with the inner upper portion of the air bag lid 12. The hinge 15 serves as a rotational axis of the movement of the air bag lid 12.

Figure 4:
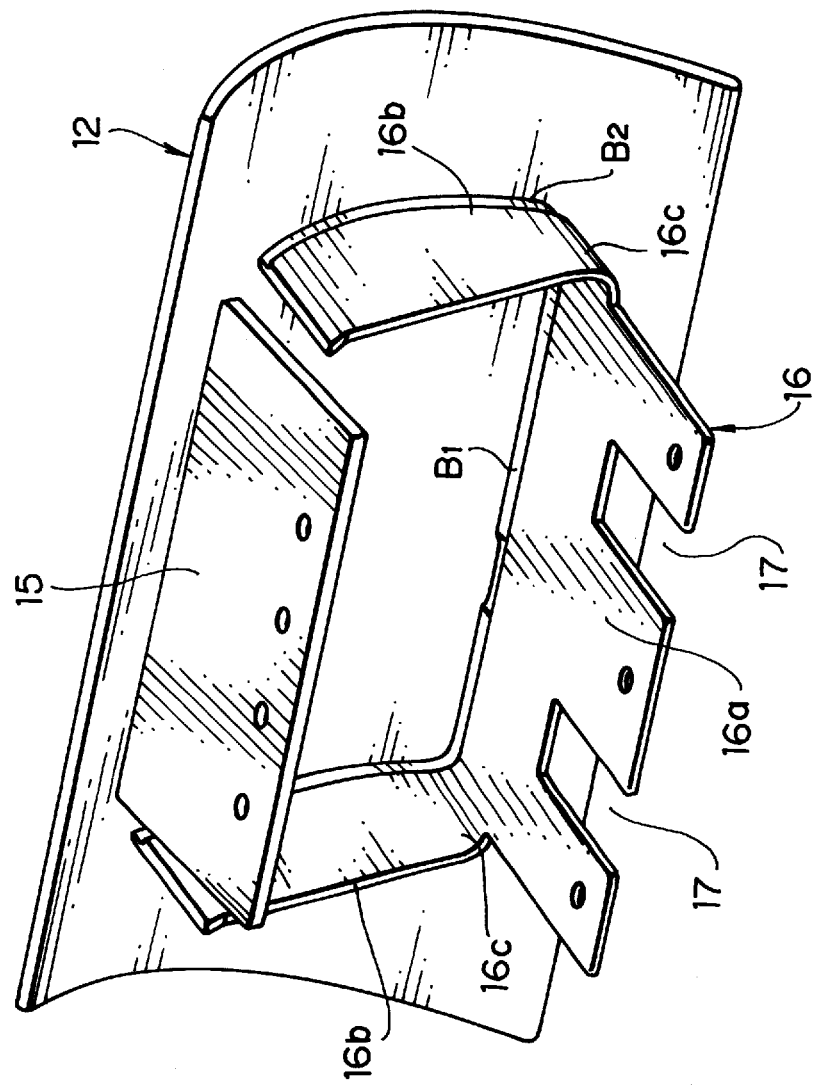
FIG. 4 is a perspective view showing the air bag lid of the air bag apparatus.

As shown in FIGS. 3 and 4, a substantially U-shaped projection 16 is formed on the inner surface of the air bag lid 12. The projection 16, made of the same material as that of the air bag lid 12 (synthetic resin), is integrally formed with the air bag lid 12. The projection 16 comprises a horizontal portion 16a which projects forward from the air bag lid 12 arranged away from the hinge 15 and vertical portions 16b which extends toward the hinge 15 from both ends of the horizontal portion 16a. The vertical portions 16b opposing to each other are adjacent to both ends of the air bag module 11's front surface. The projection 16 reinforces the rigidity of the air bag lid 12. The projection 16 further comprises corner portions 16c to which the horizontal portion 16a and the vertical portions 16b are connected. The corner portions 16c respectively have a curved surface with a relatively large radius of curvature. Further, an attaching portion 16d which is attached to the front upper end of the air bag module 11 is formed on the upper end of the vertical portion 16b. This arrangement improves the rigidity of the air bag lid 12 when it receives an external force.

The horizontal portion 16a is fixed to the lower surface of the air bag module 11 via a rivet 23. The horizontal portion 16a includes a groove 17 so that the horizontal portion 16a can be fixed to the air bag module 11, avoiding collision against the bracket 14.

Figure 5:
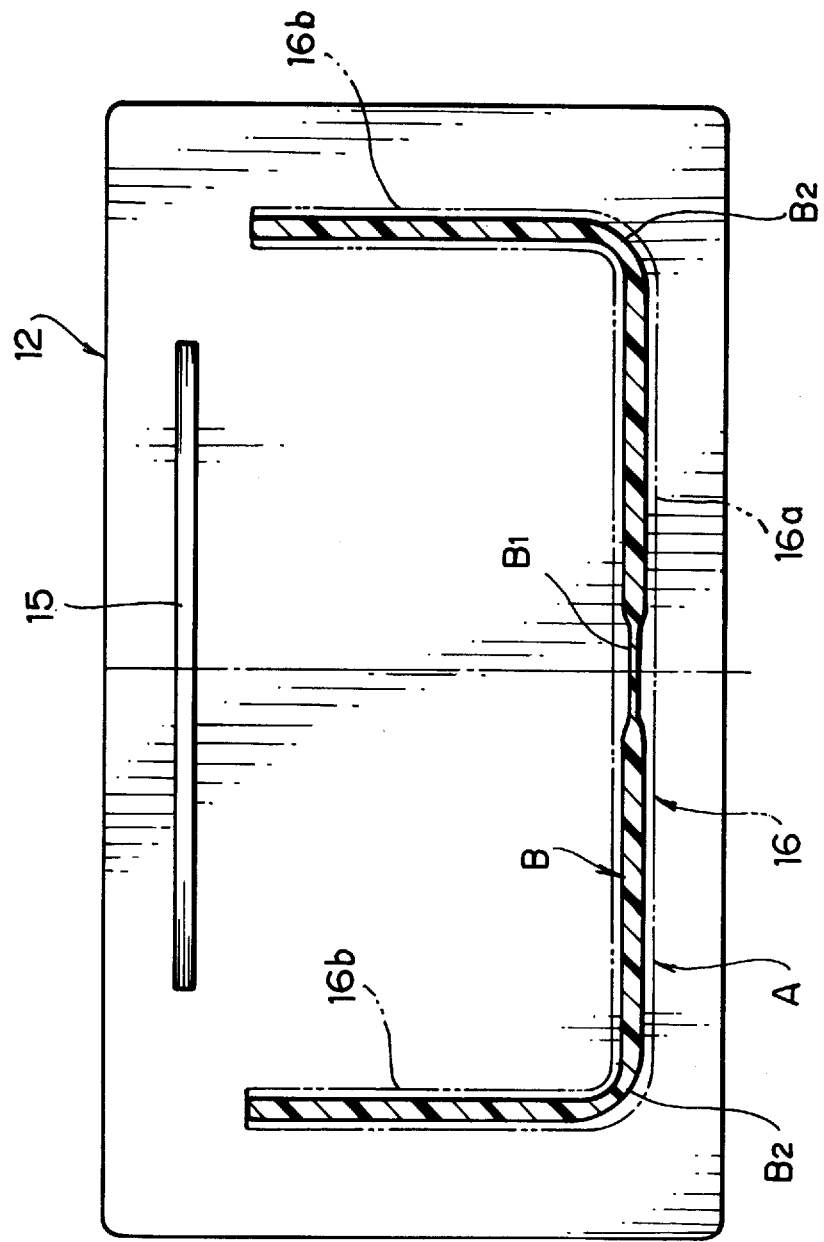
FIG. 5 is a rear view, along line 6—6 in FIG. 1, showing the air bag lid.

As shown in FIG. 5, a main portion A including a parting line portion B is formed at a connecting portion between the projection 16 and the air bag lid 12. The thickness of the parting line portion B is thinner than that of the main portion A. Particularly, the central portion of a horizontal connecting portion B1 of the parting line portion B is the thinnest. In other words, the rigidity of the horizontal connecting portion B1 is weakened, while corner connecting portions B2 of the parting line portion B are thicker than the central portion of the horizontal connecting portion B1. In other words, the rigidity of the corner connecting portions B2 is higher than that of the horizontal connecting portion B1. It should be noted that the corner connecting portion B2 is thinner than the main portion A, i.e., the rigidity of the corner connecting portions B2 is lower than that of the main portion A.

When the air bag apparatus operates, the air bag is inflated to push the air bag lid 12 in a direction towards the passenger, and the projection 16 breaks to release the air bag lid 12. The air bag shoots out toward the passenger from the opening 1a of the instrument panel 1. When the projection 16 breaks to release the air bag lid 12, it breaks from the portion of the lowest rigidity. More specifically, the central portion of the horizontal connecting portion B1 of the parting line portion B first breaks, the corner connecting portions B2 break next and the other portions follow. As the corner connecting portions B2 respectively have a curved surface with a relatively large radius of curvature, the breakage from the horizontal connecting portion B1 to the vertical portions progresses smoothly. In this manner, the breakage of the projection 16 which occurs sequentially from the portion furthest from the hinge 15 obtains the stable rotational movement of the air bag lid 12 with the hinge 15 as its axis. Therefore, the air bag lid 12 can be released upward without moving sideways or slantwise.

The conventional air bag lids have no parting line portion as described above and the thickness of a projection is uniform. In such projection, from what portion the breakage occurs is uncertain, which may cause the air bag lid to move sideways or slantwise depending upon the breakage of the projection. This movement disturbs the smooth protrusion of the air bag from the instrument panel. In an embodiment of the present invention, as the projection 16 breaks sequentially from the portion furthest from the hinge 15, the air bag lid 12 can be smoothly released in the above-described manner.

The parting line portion B formed at the connecting portion between the projection 16 and the air bag lid 12 prevents deformation of the air bag lid 12 when it is formed, improving the external appearance of the air bag lid 12.

Figure 6:
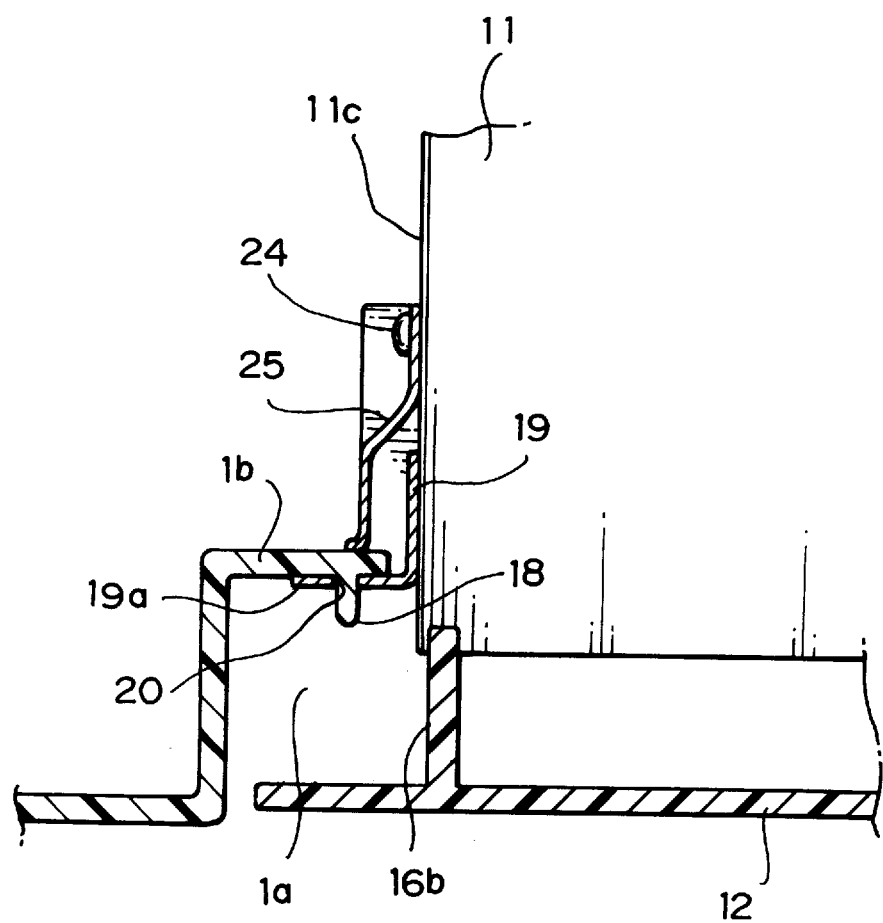
FIG. 6 is a cross-sectional view showing the air bag module connected to side portions of an opening portion in the instrument panel.

As shown in FIG. 6, which is a cross-sectional view taken from the upper side (that is, along line 6—6 in FIG. 1) showing parts surrounding the air bag lid 12, flanges 1b which extend in the vehicle width direction are connected to both right and left circumferences of the opening 1a of the instrument panel 1. The flanges 1b are integrally formed with aligning pins 18 which protrude toward the passenger seat. On the other hand, attaching plates 19 are fixed to a side surface 11c of the air bag module 11 by an appropriate connecting method such as welding. The attaching plates 19 have flange portions 19a folded back in the vehicle width direction. The aligning pins 18 are fit-inserted into engaging holes 20 formed in the flange portion 19a.

Springs 25 are fixed to the side surfaces 11c of the air bag module 11 with rivets 24. The distal ends of the springs 25 oppose to each other with gaps to the flange portions 19a of the attaching plates 19, i.e., spaces into which the flanges 1b are inserted.

Upon assembling of the air bag module 11, the aligning pins 18 of the flanges 1b are fit-inserted into the engaging holes 20 of the flange portions 19a of the attaching plate 19 to align the air bag module 11 in a front-and-back direction and a right-and-left direction and to temporarily fix the air bag module 11. The flanges 1b are held between the flange portions 19a and the springs 25, preventing the flanges 1b from falling out.

The vehicle air bag apparatus having the above construction operates as described below.

When the air bag apparatus 10 operates, the air bag lid 12 is released by the inflation of the air bag as represented by the two dot chain line in FIG. 2. At this time, the projection 16 breaks in such manner that the breakage occurs from the center of the horizontal connecting portion B1, then the corner connecting portions B2, and the other portions, thus the projection 16 is separated from the air bag lid 12. In this manner, the projection 16 breaks sequentially from the portion furthest from the hinge 15, the air bag lid 12 can be opened in a stable manner.

[Second Embodiment]

FIG. 7 illustrates an air bag lid in a vehicle air bag apparatus according to a second embodiment. In FIG. 7, elements having the same numerals as those in the first embodiment are corresponding elements.

In this embodiment, in the parting line portion B which is the connecting portion of the projection 16 and the air bag lid 12, the corner connecting portions B2 are thinner than the other portions, i.e., weakened in rigidity.

Accordingly, upon opening of the air bag lid 12, the corner connecting portions B2 of the parting line portion B break first, and the other portions follow. Also the air bag lid 12 can be released in a stable manner in this embodiment.

As described above, the vehicle air bag apparatus in the second embodiment comprises the projection 16 which is directly connected to the air bag module 11 and the rear surface of the air bag lid 12, thereby improving the air bag lid rigidity. The parting line portion B in which the rigidity of the portions far from the hinge 15 is lowered is arranged at the connecting portion of the air bag lid 12 and the projection 16 so that the projection 16 breaks sequentially from the portion far from the hinge 15. The air bag lid 12 can be released smoothly with the hinge 15 as the rotational axis.

The present invention is not limited to the above embodiments and various changes and modifications can be made within the spirit and scope of the present invention. Therefore, to apprise the public of the scope of the present invention, the following claims are made.

What is claimed is:

1. A vehicle air bag apparatus for an air bag module, the air bag module holding an air bag and being supported inside of an opening formed in an instrument panel of a vehicle, the vehicle air bag apparatus comprising:

an air bag lid for closing the opening during non-operating status of the air bag apparatus;

a hinge member for supporting said air bag lid openably and closeably in correspondence to the opening in the instrument panel;

a projection member formed integrally with the rear surface of said air bag lid, for holding said air bag lid so as to close the opening and for reinforcing said air bag lid from the rear surface, said projection member including portions of lower rigidity in which rigidity of a part furthest from said hinge member is the lowest, wherein said projection member is substantially U-shaped having a horizontal portion which extends in a vehicle front direction and which is positioned at a releasing side of said air bag lid away from said hinge portion, and vertical portions which extend from both ends of the horizontal portion toward the direction of said hinge portion and corner portions connecting the vertical portions and the horizontal portions, the lower rigidity portions are constituted by thinning the thickness of a horizontal connecting portion which connects the horizontal portion of said projection member to said air bag lid, vertical connecting portions which connect the vertical portions of said projection member to said air bag lid and corner connecting portions which connect the corner portions of said projection member to said air bag lid, a central portion of the horizontal connecting portion has a first lower rigidity portion which is the thinnest, the corner connecting portions have second lower rigidity portions which are thicker than the first lower rigidity portion, and the horizontal connecting portion, except the central portion, the vertical connecting portions, and the corner connecting portions have third lower rigidity portions which are thicker than the first lower rigidity portion and second lower rigidity portion but thinner than other portions of said projection member.

2. A vehicle air bag apparatus for an air bag module, the air bag module holding an air bag and being supported inside of an opening formed in an instrument panel of a vehicle, the vehicle air bag apparatus comprising:

an air bag lid for closing the opening during non-operating status of the air bag apparatus;

a hinge member for supporting said air bag lid openably and closeably in correspondence to the opening in the instrument panel;

a projection member formed integrally with the rear surface of said air bag lid, for holding said air bag lid so as to close the opening and for reinforcing said air bag lid from the rear surface, said projection member including portions of lower rigidity in which rigidity of a part furthest from said hinge member is the lowest;

wherein attaching members having an engaging hole are fixed to side surfaces of said air bag lid, and projections formed around the opening of the instrument panel are inserted into the engaging holes so that said air bag lid is aligned with respect to the instrument panel.

3. An apparatus as in claim 2, wherein said attaching members are L-shaped.

4. An apparatus as in claim 2, further comprising spring members to maintain said projections.

5. A vehicle air bag apparatus for use in an instrument panel of a vehicle, the instrument panel having an opening formed therein and the apparatus comprising:

a main body positionable inside the opening in the instrument panel;

an air bag lid having an inside surface facing the instrument panel;

a supporting member attached to the inside surface of the air bag lid in the vicinity of an edge of the air bag lid, and supporting the air bag lid to allow the air bag lid to open and close the opening in the instrument panel;

a projection member, separate from the supporting member, and attached to the inner surface of the air bag lid, the projection member including, a base projection member attached to the inside surface of the air bag lid in the vicinity of an edge of the air bag lid which is approximately opposite the edge where the supporting member is attached, the base projection member extending along the inside surface of the air bag lid in parallel with the direction of width of the vehicle and extending towards the main body, the base projection member having a first end and a second end, a first arm projection member attached to the inside surface of the air bag lid and extending along the air bag lid from the first end of the base projection member towards the supporting member, and a second arm projection member attached to the inside surface of the air bag lid and extending along the air bag lid from the second end of the base projection member towards the supporting member;

a fixing member fixing the base projection member to the main body; and low rigidity portions attaching the base projection member to the air bag lid and attaching the first and second arm projection members to the air bag lid to close the opening in the instrument panel with the air bag lid, wherein the low rigidity portions allow a force on the inside surface of the air bag lid to detach the base projection member and the first and second arm projection members from the inside surface of the air bag lid, thereby allowing the air bag lid to open the opening in the instrument panel while remaining supported by the supporting member.

6. The apparatus according to claim 5, wherein the low rigidity portions are low thickness portions.

7. The apparatus according to claim 6, further comprising connecting portions which connect the base projection member to the first and second arm members, respectively, wherein the low rigidity portions connect the connecting portions to the air bag lid.

8. The apparatus according to claim 6, wherein the base projection member and first and second arm projection members are connected to each other by connecting members which extend along the air bag lid.

9. The apparatus according to claim 8, wherein the base projection member, the first and second arm projection members and the connecting members are formed integrally in a substantially U-shape.

10. The apparatus according to claim 5, wherein the vehicle has a steering support member and the main body is fixed to the steering supporting member.

11. The apparatus according to claim 5, wherein the supporting member is connected to the main body.

12. The apparatus according to claim 5, further comprising:
positioning means, arranged between the main body and the opening in the instrument panel, for positioning the main body in the instrument panel.

13. A vehicle air bag apparatus for use in an instrument panel of a vehicle, the instrument panel having an opening formed therein and the apparatus comprising:
a main body positionable inside the opening in the instrument panel;
an air bag lid having an inside surface facing the instrument panel;
a supporting member attached to the inside surface of the air bag lid in the vicinity of an edge of the air bag lid, and supporting the air bag lid to allow the air bag lid to open and close the opening in the instrument panel;
a projection member, separate from the supporting member, attached to the inside surface of the air bag lid in the vicinity of an edge of the air bag lid which is approximately opposite the edge where the supporting member is attached, the projection member extending along the inside surface of the air bag lid in parallel with the direction of width of the vehicle and extending towards the main body when the air bag lid closes the opening in the instrument panel, the projection member being a continuous panel;
a fixing member fixing the projection member to the main body; and
low rigidity portions attaching the projection member to the air bag lid to close the opening in the instrument panel with the air bag lid, wherein the low rigidity portions allow a force on the inside surface of the air bag lid to detach the projection member from the inside surface of the air bag lid, thereby allowing the air bag lid to open the opening in the instrument panel while remaining supported by the supporting member.

14. The apparatus according to claim 13, wherein the low rigidity portion is a low thickness portion.

15. The apparatus according to claim 14, wherein the low rigidity portion is a continuous connecting portion between the projection member and the air bag lid.

16. The apparatus according to claim 13, wherein the vehicle has a steering supporting member and the main body is fixed to the steering supporting member.

17. The apparatus according to claim 16, wherein the low rigidity portion is a low thickness portion.

18. The apparatus according to claim 17, wherein the low rigidity portion is a continuous connecting portion between the projection member and the air bag lid.

19. A vehicle air bag apparatus for use in an instrument panel of a vehicle, the instrument panel having an opening formed therein and the apparatus comprising:

a main body holding an air bag and positionable inside the opening in the instrument panel;
an air bag lid having an inside surface;
a hinge member attached to the inside surface of the air bag lid at a hinge member attachment position and supporting the air bag lid to open and close the opening in the instrument panel with the inside surface of the air bag lid facing the instrument panel, the hinge member having an axis of rotation around which the air bag lid moves to open and close the opening in the instrument panel;
a projection member connected to the air bag lid to maintain the air bag lid in a position in which the air bag lid closes the opening in the instrument panel, the projection member being substantially U-shaped and including
a base portion which extends along the inside surface of the air bag lid, spaced away from the hinge member and in parallel with the axis of rotation of the hinge member, the base portion having a central portion positioned so that a line perpendicular to the base portion and the axis of rotation of the hinge member passes through the center of the hinge member attachment position and the central portion of the base portion, the base portion having a first end and a second end,
a first arm portion which extends along the inside surface of the air bag lid from the first end of the base portion and towards the axis of rotation of the hinge member, and
a second arm portion which extends along the inside surface of the air bag lid from the second end of the base portion and towards the axis of rotation of the hinge member; and
low rigidity portions which connect the projection member to the air bag lid, the low rigidity portions including a lowest rigidity portion at approximately the central portion of the base portion of the projection member, wherein, upon expansion of the air bag, the low rigidity portions break, with the lowest rigidity portion breaking first, so that the air bag lid opens the opening in the instrument panel.

20. An apparatus as in claim 19, wherein:
the projection member further comprises
a first connecting portion which connects the first arm portion to the first end of the base portion, and
a second connecting portion which connects the second arm portion to the second end of the base portion; and
the low rigidity portions include second lowest rigidity portions which connect the first and second connecting portions of the projection member to the air bag lid and, upon expansion of the air bag, the low rigidity portions break, with the lowest rigidity portion breaking first and the second lowest rigidity portions breaking next.

21. A vehicle air bag apparatus for an air bag module, the air bag module holding an air bag and being supported inside of an opening formed in an instrument panel of a vehicle, the vehicle air bag apparatus comprising:
an air bag lid for closing the opening during non-operating status of the air bag apparatus;
a hinge member for supporting said air bag lid openably and closeably in correspondence to the opening in the instrument panel; and
a projection member formed integrally with the rear surface of said air bag lid, said projection member extending toward, and being fixed to, the air bag module, for holding said air bag lid so as to close the opening and for reinforcing said air bag lid from the rear surface, said projection member including portions of lower rigidity in which rigidity of a part furthest from said hinge member is the lowest, wherein, upon expansion of the air bag, the portions of lower rigidity break so that said air bag lid no longer acts to close the opening in the instrument panel, and said projection member is substantially U-shaped and comprises a horizontal portion extending in a vehicle front direction and positioned at a releasing side of said air bag lid away from said hinge portion, the horizontal portion having a first end and a second end, first and second vertical portions extending, respectively, from the first and second ends of the horizontal portion toward the direction of said hinge portion, and first and second corner portions connecting, respectively, the first and second vertical portions to the horizontal portion.

22. An apparatus according to claim 21, wherein the lower rigidity portions are constituted by thinning the thickness of a horizontal connecting portion which connects the horizontal portion of said projection member to said air bag lid, vertical connecting portions which connect the first and second vertical portions of said projection member to said air bag lid and corner connecting portions which connect the first and second corner portions of said projection member to said air bag lid.

23. An apparatus according to claim 22, wherein:

a central portion of the horizontal connecting portion has a first lower rigidity portion which is the thinnest, the first and second corner connecting portions have second lower rigidity portions which are thicker than the first lower rigidity portion, and the horizontal connecting portion, except the central portion, the first and second vertical connecting portions, and the first and second corner connecting portions have third lower rigidity portions which are thicker than the first lower rigidity portion and second lower rigidity portions but thinner than other portions of said projection member.

24. The apparatus according to claim 22, wherein:

the first and second corner connecting portions each have first lower rigidity portions which are thinnest, and the horizontal connecting portion and the first and second vertical connection portions each have second lower rigidity portions which are thinner than other portions of said projection member.

25. An apparatus according to claim 22, wherein the first and second corner portions each comprise a curved surface having a large radius.

26. The apparatus according to claim 21, wherein:

said hinge member is arranged at an upper portion of said air bag lid, and said air bag lid opens upward to the instrument panel with said hinge member as the rotational axis, and the air bag module has an outer casing and the apparatus further comprises a rivet which fixes said hinge member to the outer casing of the air bag module.

27. The apparatus according to claim 26, wherein the horizontal portion of the projection member is fixed to the casing with a rivet.

28. The apparatus according to claim 21, wherein an attaching portion in contact with an upper end of the air bag module is formed at an upper end of the vertical portions.

29. A vehicle air bar apparatus for use in an instrument panel of a vehicle, the instrument panel having an opening formed therein and the apparatus comprising:

a main body positionable inside the opening in the instrument panel;

an air bag lid having an inside surface facing the instrument panel;

a supporting member attached to the inside surface of the air bag lid in the vicinity of an edge of the air bag lid, and supporting the air bag lid to allow the air bag lid to open and close the opening in the instrument panel;

a base projection member attached to the inside surface of the air bag lid in the vicinity of an edge of the air bag lid which is approximately opposite the edge where the supporting member is attached in the vicinity of, the base projection member extending along the inside surface of the air bag lid in parallel with the direction of width of the vehicle and having a first end and a second end;

a fixing member fixing the base projection member to the main body;

a first arm projection member attached to the inside surface of the air bag lid and extending along the air bag lid from the first end of the base projection member towards the supporting member;

a second arm projection member attached to the inside surface of the air bag lid and extending along the air bag lid from the second end of the base projection member towards the supporting member;

low rigidity portions attaching the base projection member to the air bag lid and attaching the first and second arm projection members to the air bag lid to close the opening in the instrument panel with the air bag lid, wherein the low rigidity portions allow a force on the inside surface of the air bag lid to detach the base projection member and the first and second arm projection members from the inside surface of the air bag lid, thereby allowing the air bag lid to open the opening in the instrument panel while remaining supported by the supporting member; and positioning means, arranged between the main body and the opening in the instrument panel, for positioning the main body in the instrument panel, wherein the opening in the instrument panel has a first side and a second side, the second side being opposite the first side, and the main body has a first side corresponding to the first side of the opening in the instrument panel and a second side corresponding to the second side of the opening in the instrument panel, the positioning means comprising positioning pins arranged in the vicinity of the first side and the second side of the opening in the instrument panel, and positioning members arranged at the first side and the second side of the main body and having holes in which the positioning pins are inserted.

30. A vehicle air bag lid for use with an opening formed in a panel, the air bag lid comprising:

a supporting member for supporting the air bag lid on an inner surface thereof in a position which closes the opening in the panel and allows the air bag lid to be rotated along a first side of the air bag lid to open the opening in the panel, the supporting member having a base supporting portion, separate from the supporting member, positioned on the inner surface away from the first side along a second side opposite to the first side of the air bag lid; and a first connector connecting the base supporting portion to the air bag lid, wherein, upon expansion of an air bag positioned inside the opening in the panel with the air bag lid closing the opening in the panel, the first connector breaks so that the air bag lid is separated from the supporting member to rotate along the first side of the air bag lid and open the opening in the panel, wherein the base supporting portion has first and second ends, the supporting member further comprises a first arm which extends away from the first end of the base supporting portion, and a second arm which extends away from the second end of the base supporting portion.

31. A vehicle air bag lid according to claim 30, wherein the first connector is located at approximately a center position of the base supporting portion in a direction along the second side of the air bag lid.

32. A vehicle air bag lid according to claim 30, further comprising:

a first arm connector which connects the first arm to the first end of the base supporting portion; and a second arm connector which connects the second arm to the second end of the base supporting portion.

33. A vehicle air bag lid as in claim 32, further comprising:

a second connector connecting the first arm connector to the air bag lid; and a third connector connecting the second arm connector to the air bag lid, wherein the second and third connectors both have a rigidity higher than the rigidity of the first connector so that, upon expansion of the air bag, the first, second and third connectors break, with the first connector breaking first and the second and third connectors breaking thereafter.

34. A vehicle air bag lid as in claim 33, wherein the second and third connectors have the same rigidity so that the second and third connectors break at the same time.

35. A vehicle air bag lid as in claim 30, further comprising:

a second connector connecting the first arm to the air bag lid; and a third connector connecting the second arm to the air bag lid, wherein, upon expansion of the air bag, the first, second and third connectors break so that the air bag lid is separated from the base supporting portion, the first arm and the second arm of the supporting member to rotate along the first side of the air bag lid and open the opening in the panel.

36. A vehicle air bag lid as in claim 35, wherein the second and third connectors both have a rigidity higher than the rigidity of the first connector so that, upon expansion of the air bag, the first, second and third connectors break, with the first connector breaking first and the second and third connectors breaking thereafter.

37. A vehicle air bag lid as in claim 36, wherein the second and third connectors have the same rigidity so that the second and third connectors break at the same time.

38. A vehicle air bag lid as in claim 30, wherein the air bag lid rotates around an axis of rotation to open the opening in the panel, and the base supporting member extends in a direction substantially parallel to the axis of rotation.

39. A vehicle air bag lid for use with an opening formed in a panel, the air bag lid comprising:

a supporting member for supporting the air bag lid on an inner surface thereof in a position which closes the opening in the panel and allows the air bag lid to be rotated along a first side of the air bag lid to open the opening in the panel, the supporting member having a base supporting portion, separate from the supporting member, positioned on the inner surface away from the first side along a second side opposite to the first side of the air bag lid, the base supporting portion including a portion parallel to the supporting member and a first and a second arm perpendicular to the base supporting portion; and a first connector connecting the base supporting portion to the air bag lid, wherein, upon expansion of an air bag positioned inside the opening in the panel with the air bag lid closing the opening in the panel, the first connector breaks so that the air bag lid is separated from the supporting member to rotate along the first side of the air bag lid and open the opening in the panel.

40. A vehicle air bag lid according to claim 39, wherein the base supporting portion has first and second ends, the first arm extending away from the first end of the base supporting portion, and the second arm extending away from the second end of the base supporting portion.

41. A vehicle air bag lid as in claim 40, further comprising:

a second connector connecting the first arm to the air bag lid; and a third connector connecting the second arm to the air bag lid, wherein, upon expansion of the air bag, the first, second and third connectors break so that the air bag lid is separated from the base supporting portion, the first arm and the second arm of the supporting member to rotate along the first side of the air bag lid and open the opening in the panel.

42. A vehicle air bag lid as in claim 39, wherein the air bag lid rotates around an axis of rotation to open the opening in the panel, and the base supporting member extends in a direction substantially parallel to the axis of rotation.

43. A vehicle air bag apparatus, comprising:

an air bag lid which covers an opening formed in an instrument panel;

a main body positioned at a side of the opening opposite a passenger;

a first supporting member including one end attached to an inner surface of the air bag lid in the vicinity of a first edge of the air bag lid and an other end connected to the main body;

a second supporting member including one end attached to the inner surface of the air bag lid in the vicinity of a second edge of the air bag lid opposed to said first edge of the air bag lid and an other end connected to the main body;

a third supporting member including one end attached to the inner surface of the air bag lid between said first supporting member and said second supporting member in the vicinity of a third edge of the air bag lid and an other end separated from the main body;

a fourth supporting member including one end attached to the inner surface of the air bag lid between said first supporting member and said second supporting member in the vicinity of a fourth edge of the air bag lid opposed to said third edge of the air bag lid and an other end separated from the main body; and a tearing portion which is torn when an air bag arranged in the main body expands so that said air bag lid is pivotally opened around said first supporting member.

44. The apparatus according to claim 43, wherein the other ends of said third and fourth supporting members are in near contact with the main body.

45. The apparatus according to claim 43, wherein said tearing portion is arranged at said second supporting member and includes a thin portion which is torn when the air bag expands.

46. The apparatus according to claim 45, wherein said second supporting member and said third and fourth supporting members are connected to each other.

47. The apparatus according to claim 46, wherein said tearing portion is arranged at said third and fourth supporting members and includes a thin portion which is torn when the air bag expands.

48. The apparatus according to claim 45, wherein said first supporting member becomes a pivoting center of the air bag lid when the air bag lid opens.

49. The apparatus according to claim 43, wherein said second supporting member and said third and fourth supporting members are connected to each other.

50. The apparatus according to claim 49, wherein projecting amounts of said third and fourth supporting members from said air bag lid are gradually reduced from said second supporting member towards said first supporting member.

51. The apparatus according to claim 49, wherein projecting amounts of said third and fourth supporting members from said air bag lid are smaller than that of said second supporting member.

52. The apparatus according to claim 43, wherein projecting amounts of said third and fourth supporting members from said air bag lid are gradually reduced from said second supporting member towards said first supporting member.

53. The apparatus according to claim 43, wherein said third and fourth supporting members have contact portions which contact said main body at their upper portions.

54. The apparatus according to claim 43, wherein said second supporting member has grooves for avoiding collision against a supporting member which supports said main body.

55. The apparatus according to claim 43, wherein an interval between said third supporting member and said fourth supporting member is larger than a length of said first supporting member along the first edge of the air bag lid.

* * * * *

UNITED STATES PATENT AND TRADEMARK OFFICE
CERTIFICATE OF CORRECTION

PATENT NO. : 5,769,451
DATED : June 23, 1998
INVENTOR(S) : Haruhiro INADA, et al.

It is certified that error appears in the above-identified patent and that said Letters Patent is hereby corrected as shown below:

Column 1,        line 32, delete "occurs".

Column 2,        line 23, delete ", along line 6-6 in Fig. 1,";
line 25, after "view" insert --, along line 6-6 in Fig. 1,--.

Signed and Sealed this

Twenty-ninth Day of June, 1999

Attest:

Attesting Officer

Q. TODD DICKINSON

Acting Commissioner of Patents and Trademarks